June 18, 1968   W. H. COOK   3,389,100
ANTISKID PRINTING INK COMPRISING SILICA
AEROGEL AND/OR CORNSTARCH
Filed Jan. 25, 1965
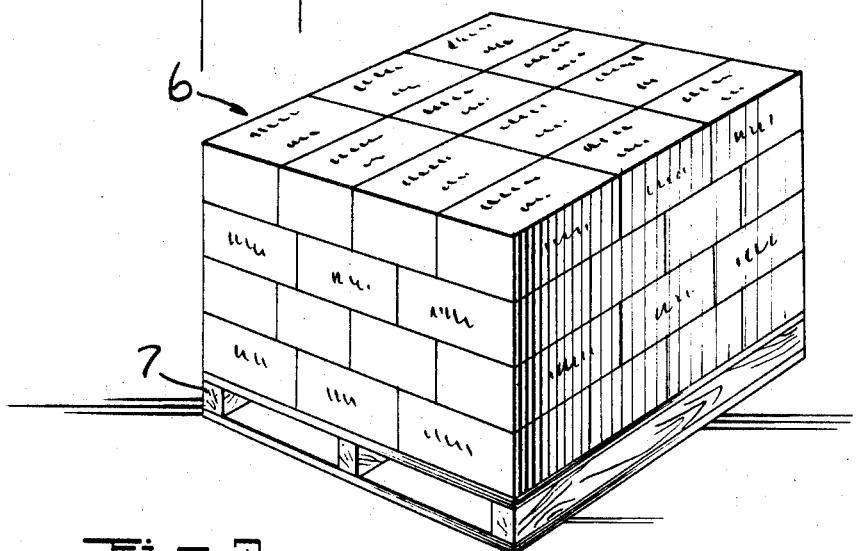
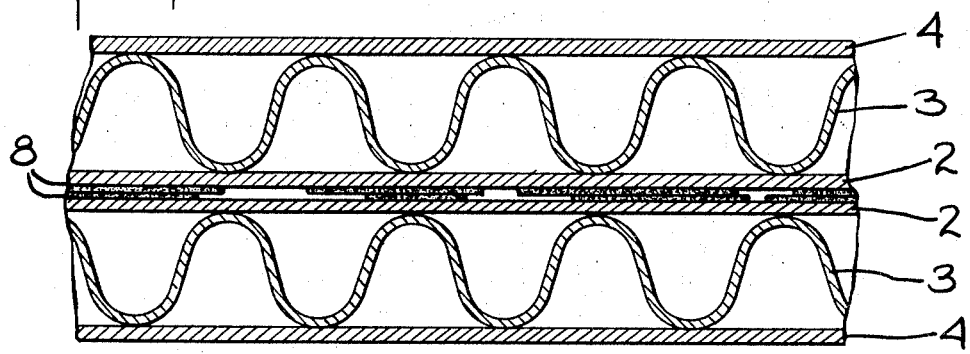
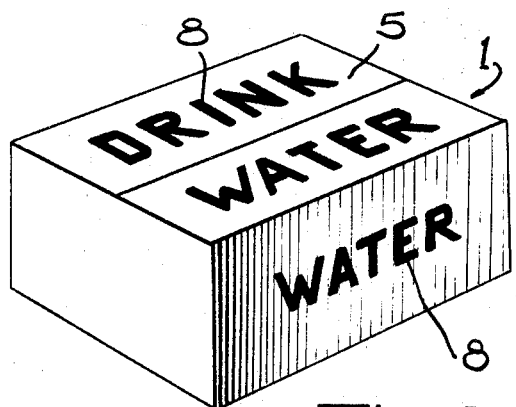
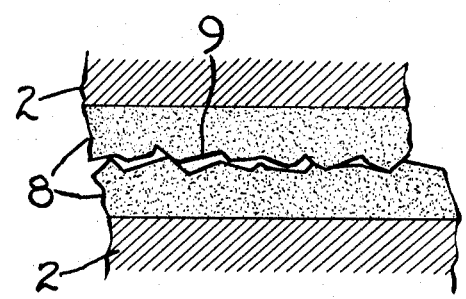
INVENTOR.
WILLIAM H. COOK
BY
ATTORNEY 3,389,100
ANTI-SKID PRINTING INK COMPRISING SILICA
AEROGEL AND/OR CORNSTARCH
William H. Cook, Lancaster, Ohio, assignor to Anchor Hocking Glass Corporation, Lancaster, Ohio, a corporation of Delaware
Filed Jan. 25, 1965, Ser. No. 427,776
5 Claims. (Cl. 260—9)

ABSTRACT OF THE DISCLOSURE

A printing ink having a high coefficient of friction for use on paperboard cartons to prevent sliding between the individual decorated cartons when stacked for shipment. The ink comprises a high gloss synthetic resin ink containing a dispersed drying oil and cornstarch or silica aerogel in amounts sufficient to give the ink an antiskid quality and also may include an amount of microcrystalline wax sufficient to improve the antiscuff quality of the ink.

---

The present invention relates to improved shipping containers. More particularly, the invention provides shipping containers such as paperboard cartons with an improved friction surface comprising a new antiskid and antiscuff decorative surface.

Paperboard containers are used extensively for packing and shipping a wide variety of commodities including glass articles. In modern materials handling methods, these containers are stacked on pallets for shipment in large quantities. For example, several dozen containers may be stacked on pallets by manufacturers for shipment to distribution points.

These shipping containers, including those made from corrugated container board have smooth surfaces and tend to slip when the pallets are moved or tilted slightly during shipment. The problem is compounded because of the popularity of high gloss printing inks for enhancing the container appearance. The high gloss inks dry to a hard smooth surface and they increase the tendency of cartons to slide on stacked allets.

To overcome this problem, paperboard containers have been coated with an antiskid composition prior to decoration. This arrangement is not satisfactory because the smooth high gloss inks overprint the antiskid coating and reduce or nullify the effectiveness of the coating.

The present invention is directed to improvements in paperboard shipping containers by printing the containers with a new antiskid ink having a high gloss quality. Moreover, the printing ink of the present invention resists scuffing or scratching during fabrication and handling of the containers. In the practice of the present invention, additives are included in ink formulas to achieve the desired antiskid and antiscuff qualities.

Accordingly, an object of the present invention is to provide an improved antiskid container.

Another object of the present invention is to provide a paperboard container printed with an antiskid and antiscuff ink which resists abusive treatment during fabrication and subsequent handling.

Another object of the present invention is to provide an ink which forms an antiskid surface.

A further object of the present invention is to provide an antiskid ink particularly suitable for printing on paperboard containers.

Another object of the present invention is to provide an antiskid ink particularly suitable for paperboard containers which will not reduce the high gloss quality of the ink.

Another object of the present invention is to provide a high gloss, antiskid ink which is scuff resistant.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 illustrates a carton which is printed with the ink composition of the present invention;

FIG. 2 illustrates a pallet load of cartons printed with the ink of the present invention;

FIG. 3 is a detailed sectional view of cartons stacked on a pallet illustrating the position of the printed surface of each of the cartons; and FIG. 4 is an enlarged fragmentary view corresponding to FIG. 3 showing the antiskid surface of stacked cartons of the present invention.

Referring to the drawings and more particularly to FIG. 1, a shipping container 1 is used for packing various commodities or food packages such as coffee jars or jelly pars. The container may be manufactured using any suitable paperboard material. For example, the container may be made from corrugated container board as is well known in the art. As illustrated in FIG. 3, a corrugated container board comprises an outer layer 2 spaced from an inside layer 3 by means of a corrugated section 4. The outer board surface 5 is smooth and unless treated with an antiskid composition the cartons tend to slip with respect to each other particularly when stacked as at 6 and shipped on a pallet 7 shown in FIG. 2.

The outside surface of the container is printed as at 8 in FIGS. 1 and 3 for identification. If desired, the container may be printed with several contrasting colors for decorative purposes. For example, red lettering may be printed over a solid yellow field which presents an attractive appearance. Usually, the ink composition produces a high gloss finish to enhance the appearance of the container.

High gloss ink dries to a hard smooth surface. Consequently, the container surface, including both the usual kraft paper outer layer and the inked areas, has a smooth relatively slippery surface. These containers have a greater tendency to fall off stacked pallets than do containers printed according to the present invention. Similarly, containers treated with an antiskid coating such as Ludox lose their antiskid characteristic when covered with the usual high gloss inks.

According to the present invention, containers are printed with new inks to give a high gloss appearance, to provide the container with an antiskid surface, and to resist scuffing. Antiskid and antiscuff additives are included in an ink formula for printing containers. The ink formulation given below is illustrative of those which may be used in carrying out the present invention.

While any ink suitable for printing paperboard stock may be used, the preferred ink formula includes a synthetic resin dispersed in a vegetable drying oil. This preferred ink is best suited for printing kraft paper carton stock.

| | Lbs. |
|---|---|
| Gloss varnish | 26.80 |
| #1 lithographic varnish | 6.40 |
| Titanium dioxide | 5.60 |
| Medium lithol red | 14.20 |
| Light lithol red | 10.70 |
| Molybdated orange | 4.00 |
| Blanc fixe | 27.20 |
| Paste drier | 2.40 |
| Cobalt drier | 1.00 |
| | 98.30 |

The gloss varnish comprises a synthetic resin dispersed in a suitable vegetable drying oil. While any well-known synthetic resin may be used it is preferable to use an alkyd resin dispersed in a vegetable drying oil such as linseed oil. If desired, copal gum and China wood oil may be blended with the linseed oil. Preferably, a #1 lithographic varnish of thin consistency may be blended with gloss varnish to improve the flow characteristics.

Pigments may be selected as desired in order to obtain a particular color or tone of a given color. The pigments included in the above formula will produce a bright red color. The pigments are predispersed in linseed oil as is well known in the art.

Blanc fixe predispersed in linseed oil is the preferred extender for the pigments. Blanc fixe extends the pigments without loss of color strength.

Suitable drying agents are included in the formula and may include a paste drier such as manganese borate predispersed in linseed oil and a metallic cobalt drier. These driers are added to aid in the drying of the printed ink.

The antiskid and antiscuff preparations are added to the formulations such as the above formulation.

With respect to improving the antiskid quality of the ink, I have determined that cornstarch when added in proper amounts gives the desired results. The cornstarch may be added in amounts ranging between ½ of 1% to 2½% by weight of the ink formulation. The exact amount of cornstarch added to the ink formula depends upon the amount of solids needed in the formula for deep colors. With respect to the ink formula given above approximately 1½ lbs. (1½% by weight) of starch has been found to give the desired result.

I have also determined that silica aerogel may be used in lieu of cornstarch as an antiskid additive. Silica aerogel may be added in an amount ranging between 1/10 of 1% to ½ of 1% by weight of the ink composition. I have found that approximately 0.3 lb. (3/10 of 1%) of silica aerogel will give the desired result in the above formula.

If desired, both the cornstarch and the silica aerogel may be added to obtain the antiskid quality. In this situation, the cornstarch and silica aerogel may be added in the ranges set out above. Satisfactory results have been obtained by adding 1 lb. of cornstarch and 0.1 lb. of silica aerogel in the above ink formula.

Silica aerogel is commercially available from the Monsanto Chemical Company under the trademark Santocel.

If desired, the cornstarch and/or silica aerogel may be added to the ink formula by the printer but preferably they will be included in the formulation by the ink manufacturer.

I have found that the antiskid additives incorporated in the ink formula provide the dried ink surface with a slightly roughened texture as shown at 9 in FIG. 4. This roughened texture of the ink surface is somewhat susceptible to scuffing.

The usual remedies for scuffing are not acceptable in achieving the objects of the present invention. For example, carnauba wax has been considered best for reducing the tendency of ink to scuff. However, this wax produces a hard, slippery finish on the ink thereby reducing the desired antiskid quality.

I have found that microcrystalline wax dispersed in linseed oil improves the scuff resistance of the ink according to the present invention. A microcrystalline wax with a melting point of between 160 and 180° F. may be used. Preferably, a wax having a melting point of 170° F. is added to the ink composition. Microcrystalline wax may be added in the range of between 5 and 7% by weight of the final ink formula. In the formulation set out above 6 pounds of microcrystalline wax dispersed in linseed oil are added to the wax composition during the formulation.

Inks formulated according to the present invention can be applied to paperboard containers by the usual printing methods. Laboratory tests have determined that these printing inks have increased the coefficient of friction by approximately 60% over that of the unprinted area of paperboard cartons.

The printing inks formulated according to the present invention may be used on carton stock regardless of whether the stock is pretreated with an antiskid coating. Where the carton is pretreated with an antiskid coating the printing inks of the present invention cooperate with such coatings to give a much improved friction surface when compared to ordinary inks printed over antiskid coatings.

It will be seen that applicants have provided a new and improved ink composition for printing paperboard containers which aids the efficient handling of such containers by modern materials handling methods. The inks are high gloss and give the cartons an improved friction surface which resists instability in pallet loads. The inks moreover are scuff resistant and retain an attractive appearance throughout shipment.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A high gloss printing ink for increasing the coefficient of friction of paperboard comprising a synthetic resin dispersed in a vegetable drying oil, a coloring agent, and between ½ of 1% to 2½% by weight of cornstarch added to the ink to give the ink an antiskid quality.

2. A high gloss printing ink for paperboard cartons comprising a synthetic resin dispersed in a vegetable drying oil, a coloring pigment, between ½ of 1% and 2½% by weight of cornstarch added to the ink to give an antiskid character and approximately 5 to 7% by weight of microcrystalline wax added to improve the antiscuff quality of the printing ink.

3. A high gloss ink composition for printing paperboard cartons comprising an alkyd resin dispersed in a vegetable drying oil, a coloring pigment, cornstarch added to the ink in amounts between ½ of 1% to 2½% by weight of the ink composition to improve the antiskid characteristic of the ink and approximately 5 to 7% by weight microcrystalline wax predispersed in linseed oil to improve the antiscuff quality of the ink.

4. A high gloss printing ink for corrugated cartons comprising a synthetic resin dispersed in a drying oil, a coloring pigment between ½ of 1% and 2½% by weight of cornstarch, and between 1/10 of 1% and ½ of 1% of silica aerogel to give the ink an antiskid quality.

5. A high gloss printing ink for corrugated cartons comprising a synthetic resin dispersed in a vegetable drying oil, a coloring pigment between ½ of 1% and 2½% by weight cornstarch and between 1/10 of 1% and ½ of 1% by weight silica aerogel added to the ink to give an antiskid character and approximately 5 to 7% by weight microcrystalline wax dispersed in linseed oil to improve the antiscuff quality of the printing ink.

References Cited

UNITED STATES PATENTS

| | | | |
|---|---|---|---|
| 2,256,024 | 9/1941 | Hill | 214—10.5 |
| 2,291,293 | 7/1942 | Curtis | 106—20 |
| 2,332,066 | 10/1943 | Erickson et al. | 106—152 |
| 2,876,119 | 3/1959 | Dithmar | 106—20 |
| 2,892,730 | 6/1959 | Kloepfer et al. | 106—193 |
| 3,010,833 | 11/1961 | Cataldo | 106—26 |
| 3,075,845 | 1/1963 | Goulston et al. | 106—31 |
| 3,234,873 | 2/1966 | Miller | 101—149.2 |
| 3,245,825 | 4/1966 | Fessler | 117—38 |

FOREIGN PATENTS

| | | |
|---|---|---|
| 149,978 | 2/1953 | Australia. |
| 599,888 | 6/1960 | Canada. |

OTHER REFERENCES

Modern Packaging Magazine, issue of December 1956, published by McGraw-Hill, Inc., 330 W. 42nd St., New York, 10036, article entitled "Nonskid for Corrugated," pages 127, 128, 129.

WILLIAM H. SHORT, *Primary Examiner.*

GEORGE O. RALSTON, *Examiner.*

E. M. WOODBERRY, *Assistant Examiner.*